United States Patent [19]
Kavthekar et al.

[11] 3,724,357
[45] Apr. 3, 1973

[54] INTEGRATED AIR DISTRIBUTION SYSTEM

[75] Inventors: Keshav S. Kavthekar, Melvindale; Jess J. Somers, Redford Township, both of Mich.

[73] Assignee: Ford Motor Company, Dearborn, Mich.

[22] Filed: Dec. 8, 1971

[21] Appl. No.: 205,825

[52] U.S. Cl. .................... 98/2.11, 98/2.05, 98/2.16, 62/244
[51] Int. Cl. ........................................ B60i
[58] Field of Search ............ 98/2.01, 2.05, 2.06, 2.07, 98/2.08, 2.11, 2.16

[56] References Cited

UNITED STATES PATENTS

| | | | |
|---|---|---|---|
| 2,836,113 | 5/1958 | Seyfarth | 98/2.07 |
| 2,893,700 | 7/1959 | Boylan | 98/2.07 |
| 3,382,791 | 5/1968 | Henry-Biabaud | 98/2.06 |

*Primary Examiner*—William J. Wye
*Attorney*—Keith L. Zerschling et al.

[57] ABSTRACT

An air distribution system integrated into a molded plastic instrument panel for a vehicle body, the instrument panel being capped by a crash pad. The air distribution system comprises a duct integrally molded into the instrument panel and sharing walls in common therewith. The duct is encompassed across its frontal and upper surfaces by the crash pad with an insulating air gap therebetween. The duct is substantially open on its rear side and the open surface is fitted with a molded plastic cover plate to form the complete duct. Spaced openings in the face of the instrument panel provide for air distribution from the duct to the vehicle body interior. A "Y"-shaped piece having indirect line of sight from its inlet to its outlets connects the integral duct to the plenum chamber of a vehicle heating and cooling unit.

12 Claims, 9 Drawing Figures

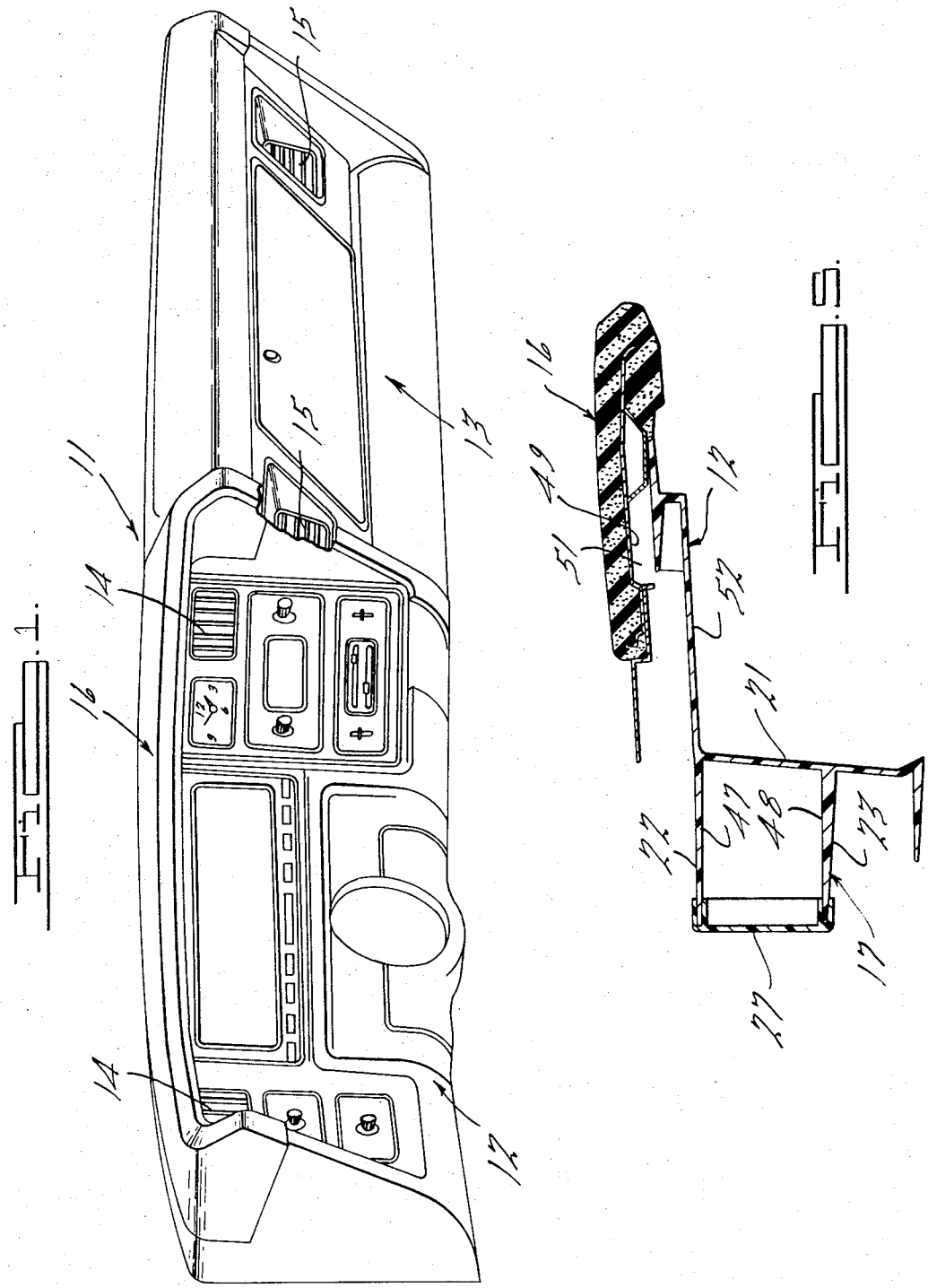

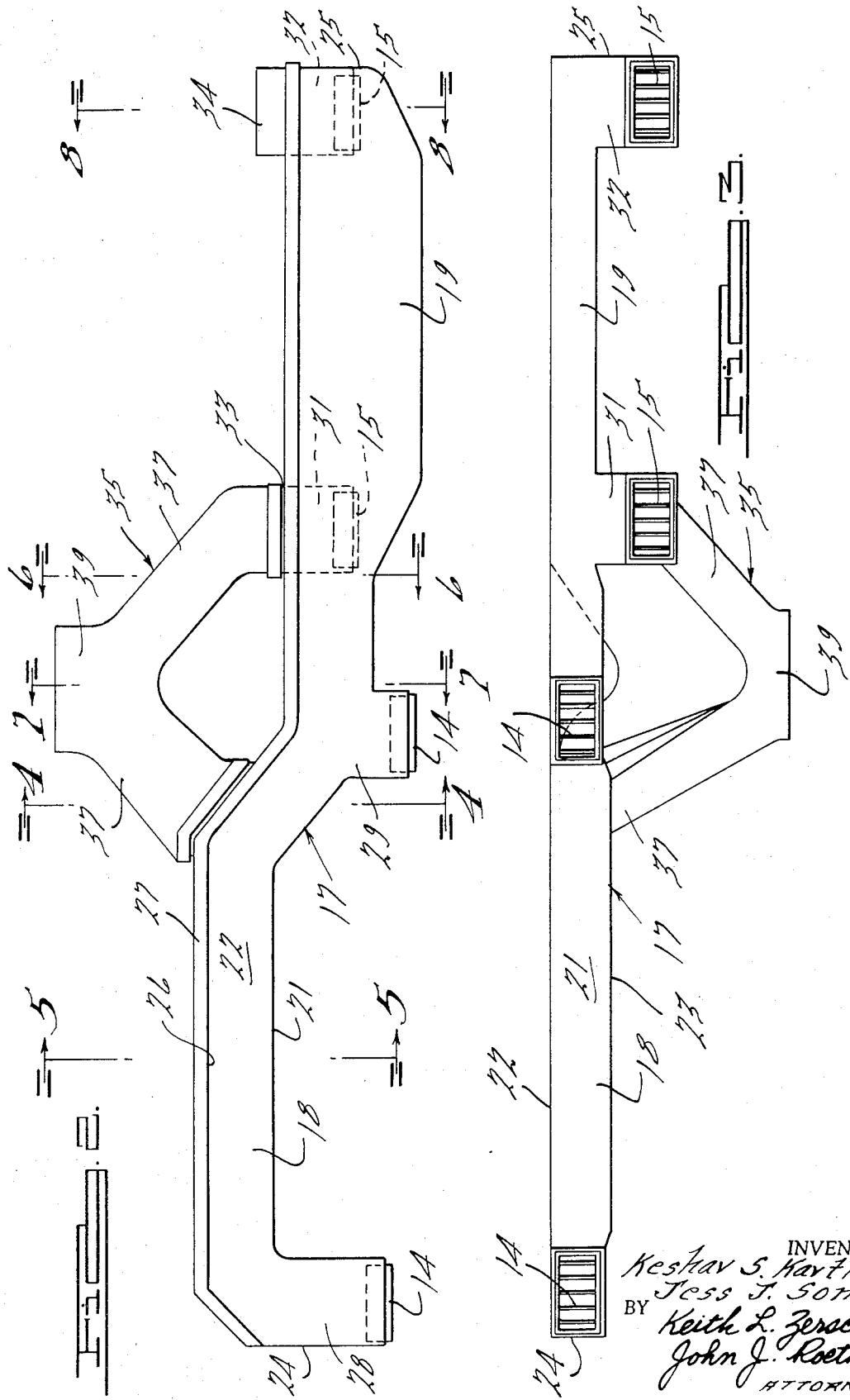

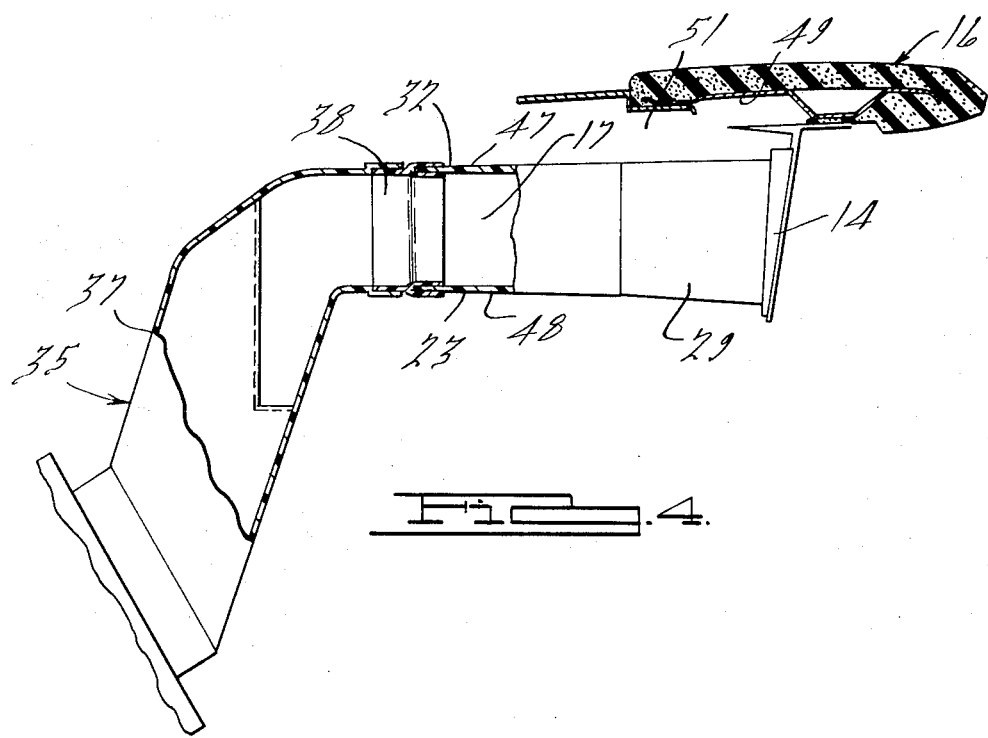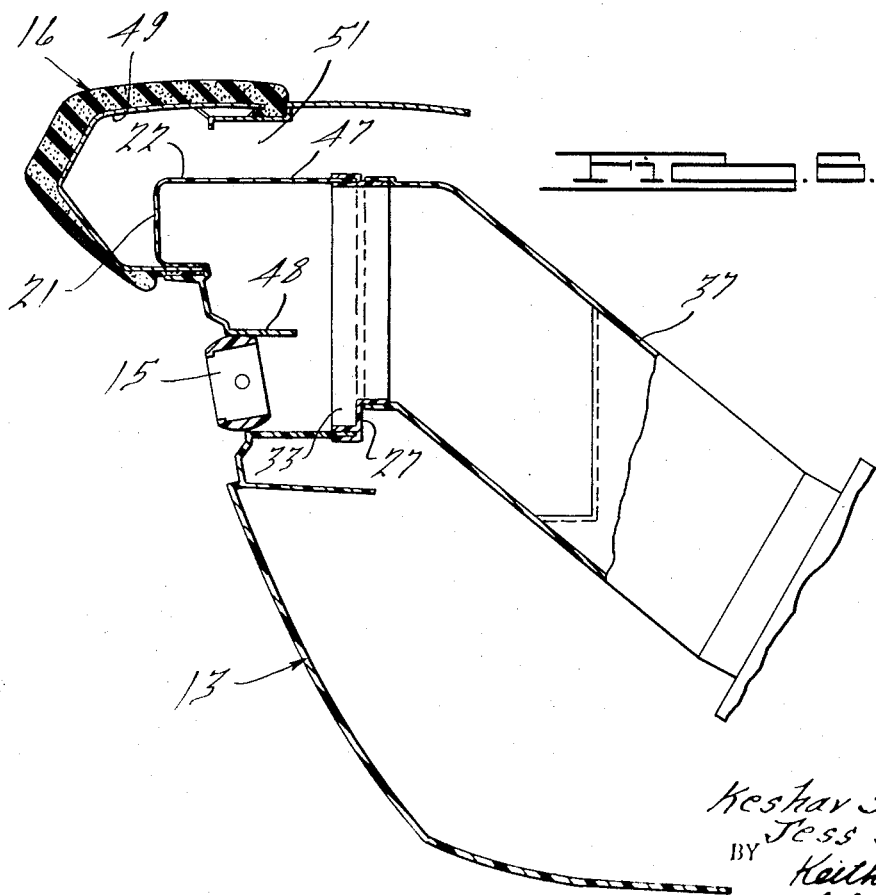

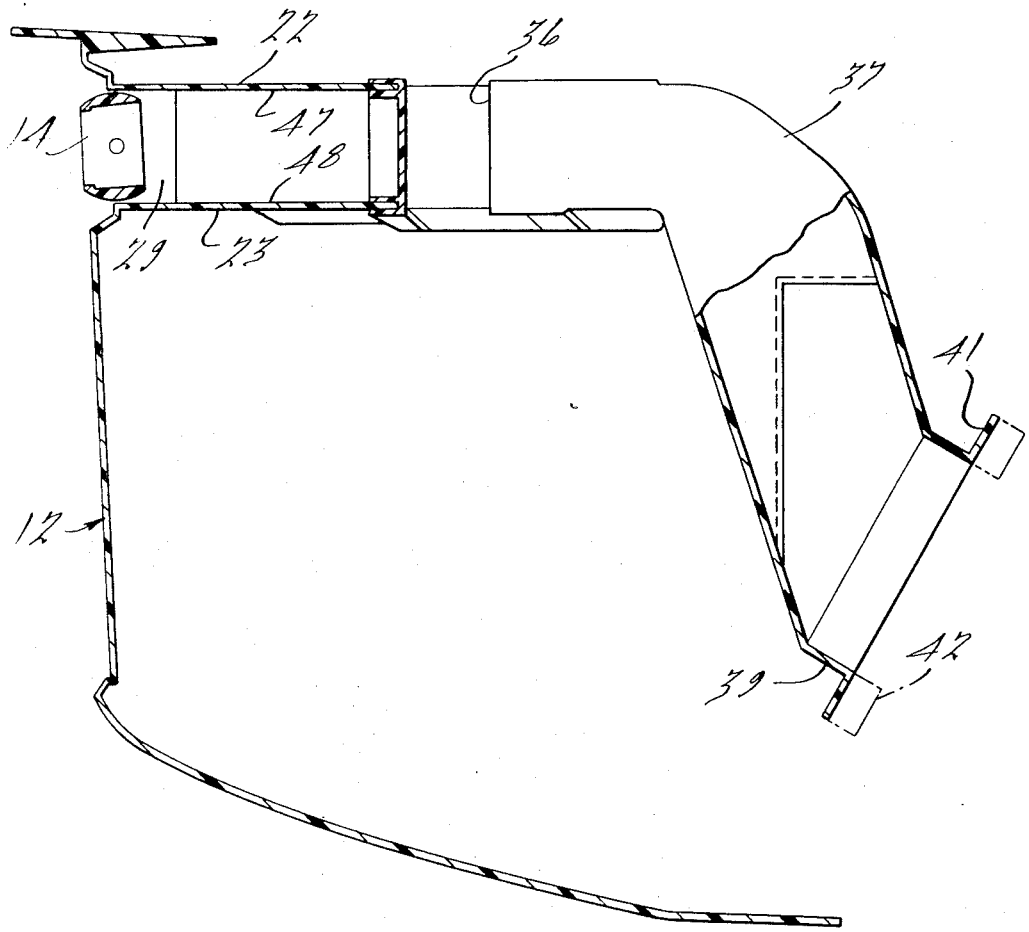
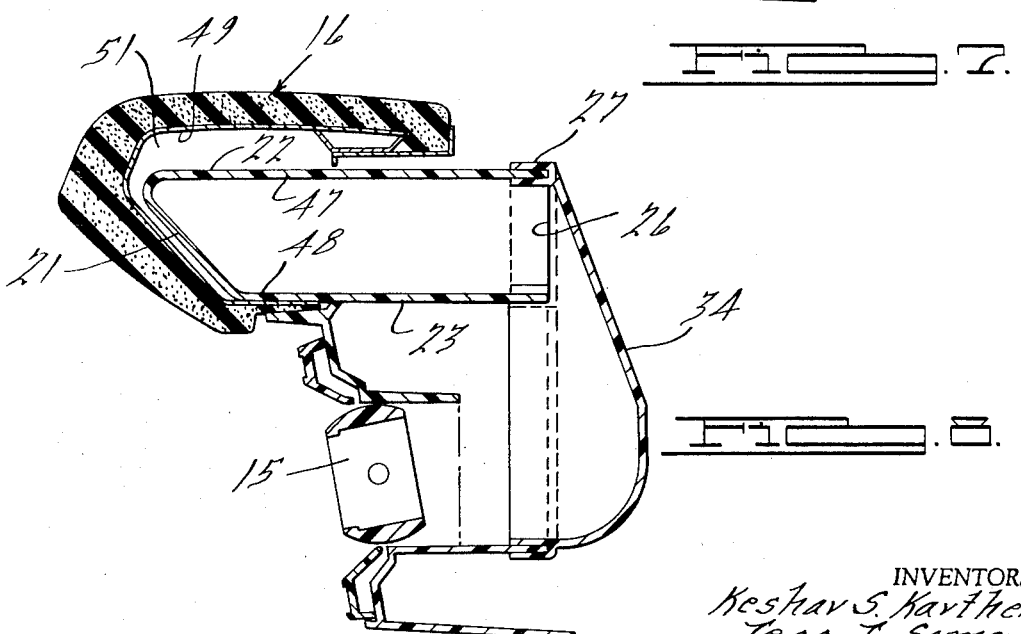

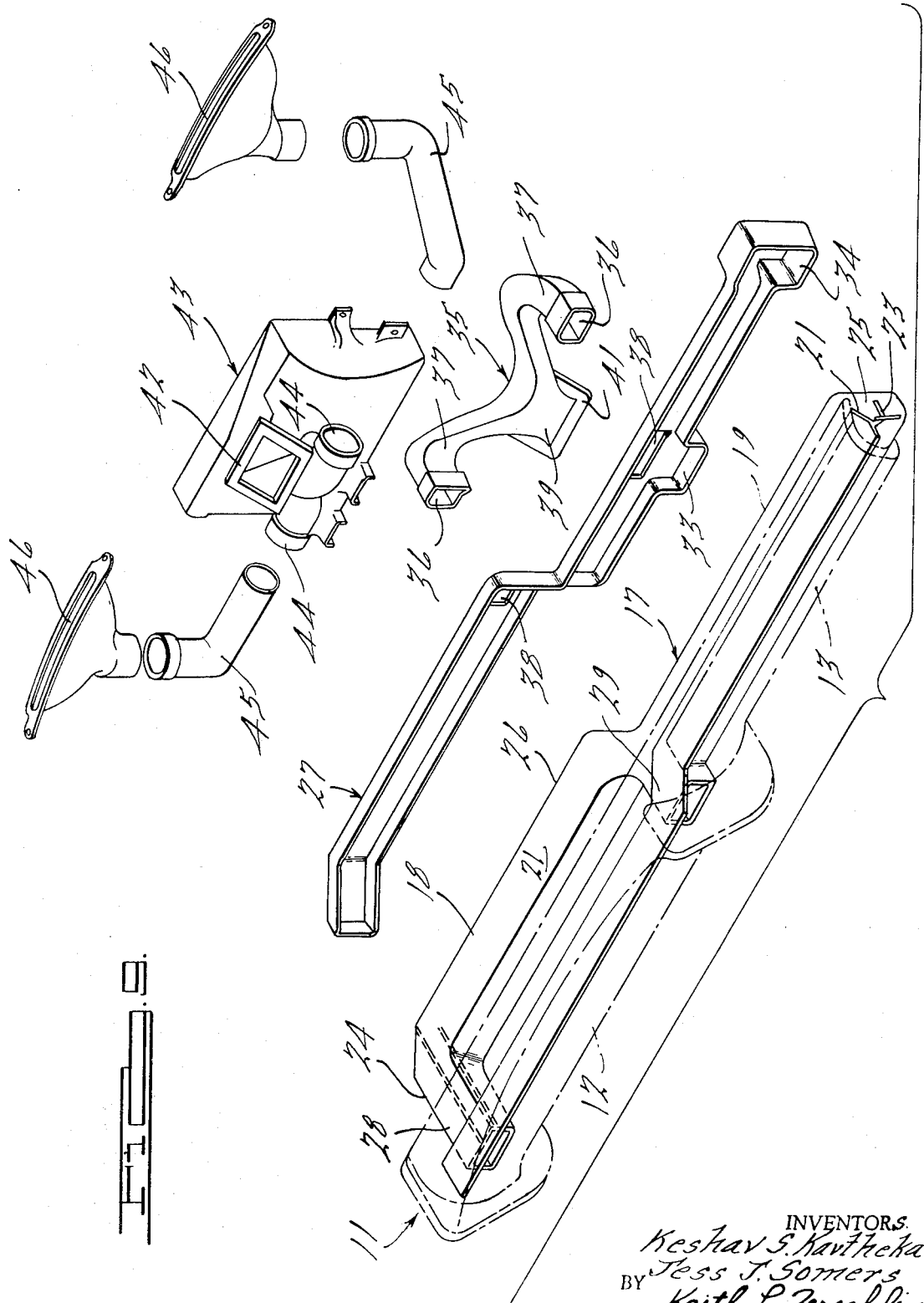

INTEGRATED AIR DISTRIBUTION SYSTEM

BACKGROUND OF THE INVENTION

The conventional vehicle instrument panel and inner cowl structure are elongated sheet metal stampings welded together onto the vehicle body shell. In the finished vehicle body, they are covered on the frontal and upper surfaces with a crash pad. The front face of the instrument panel reveals a plurality of instruments which have been mounted therein and are necessary for the operation of the vehicle. A plurality of air registers also are placed in the instrument panel front face for distribution of heated or cooled air into the vehicle passenger compartment. Beneath the cowl and to the rear of the instrument panel is a jungle of wires and conduits. The conduits and ducts, some rigid and some flexible, connect the air registers on the instrument panel to the air distribution manifold associated with the vehicle compartment heating and cooling unit.

Because of advances in the technology of molding large and complex panels, it is expected that future model vehicles will be equipped with molded plastic instrument panels. Accordingly, it is an object of the present invention to eliminate a large part of the confusion beneath the cowl and instrument panel by integrating the conduits and duct work into the instrument panel structure.

SUMMARY OF THE INVENTION

The present invention relates to an air distribution system for a vehicle providing having a molded plastic instrument panel extending across the vehicle body passenger compartment. The instrument panel is capped by a crash pad assembly. The air distribution system comprises a duct integrally molded into the instrument panel and extending substantially across the width of the latter. The duct has frontal and top wall portions in common with the instrument panel and is encompassed across its frontal and upper surfaces by the crash pad with an insulating air gap therebetween. The duct is substantially uniformly opened across its surface opposite its crash pad covered frontal surface. A cover plate is fitted on the duct over the open surface. There are spaced openings in the face of the instrument panel in communication with the integral duct, the spaced openings provided for air distribution to the interior of the vehicle body. A pipe means connected to the cover plate and adapted to be coupled to a plenum chamber of a vehicle heating and cooling unit provides a source of heating or cooling air to the duct.

DESCRIPTION OF THE DRAWINGS

Further features and advantages of the present invention will be made more apparent as this description proceeds, reference being had to the accompanying drawings, wherein:

FIG. 1 is a perspective frontal view of an instrument panel having an integrated air duct system as embodied in the present invention;

FIG. 2 is a plan view of the air duct portion only of the integrated instrument panel and air duct system;

FIG. 3 is a frontal view of FIG. 2;

FIG. 4 is a section view on the line 4—4 of FIG. 2;

FIG. 5 is a section view on the line 5—5 of FIG. 2;

FIG. 6 is a section view on the line 6—6 of FIG. 2;

FIG. 7 is a section view on the line 7—7 of FIG. 2;

FIG. 8 is a section view on the line 8—8 of FIG. 2; and

FIG. 9 is an exploded view illustrating the components of the air distribution system as they appear independently of the remainder of the structure of the instrument panel.

DETAILED DESCRIPTION OF THE INVENTION

Referring first to FIG. 1, there is illustrated a vehicle body instrument panel, generally designated 11, which is adapted to extend across the interior width of a vehicle passenger compartment. For purposes of description, the front face of the instrument panel 11 is that face which is visible to the vehicle compartment passenger. The exemplary instrument panel 11 has two main portions, the instrument bearing portion 12 and the storage portion 13. The instrument portion 12 is set back from the storage portion 13 and has the usual array of dials and knobs. It is also provided with air registers 14. The storage portion 13 also has a plurality of registers 15. The upper frontal portion and the upper surface of the instrument panel 11 are covered with a crash pad 16.

An important aspect of the present invention is the provision of means for air distribution to the pairs of air registers 14 and 15. In a vehicle body construction in which the instrument panel structure is a sheet metal stamping, the conduits or ducts from the heating or cooling unit manifold to the several air registers comprise rigid or flexible pipe or tubing sections. In the present invention, the duct is integrally molded with the instrument panel.

With reference to FIGS. 2, 3 and 9, the duct, generally designated 17, for purpose of explanation is shown functionally independently of the instrument panel 11 and crash pad 16. The duct 17 has two main portions 18 and 19 corresponding to the instrument bearing portion 12 and the storage portion 13, respectively, of the instrument panel 11. It has a frontal surface 21, an upper surface 22 and a bottom surface 23 in substantially parallel vertically spaced relationship to the upper surface 22. From one end 24 to the other end 25 the duct is substantially "U"-shaped. The rear face 26 of the duct 17 is open. The opening, however, is covered by a cover plate 27 which is complementary in shape to the rear face of the duct 17.

Opening off the frontal surface 21 of the duct 17 are a plurality of extension ducts 28 and 29 leading to the register 14 in the instrument bearing portion 12 of the instrument panel 11. Similarly, the air registers 15 are in communication with the main duct 17 through vertical extensions 31 and 32, respectively, off the duct portion 19. The cover plate 27 is provided with vertical extensions 33 and 34 coordinated with the duct extensions to provide a suitable passageway for the air flow to the register 15.

Heated or cooled air is supplied to the duct 17 through a "Y"-shaped piece, generally designated 35. The "Y"-piece has the upper end 36 of each diverging leg 37 connected to an inlet port 38 in the cover plate 27. The vertical leg 39 of the "Y"-piece has an integral flange 41 adapted to be coupled to a boss 42 on the base of a plenum chamber 43 (see FIG. 9) of a heating or cooling unit (not shown). The plenum chamber 43 has provision at 44 for receiving hoses or conduits 45 adapted to be coupled to defroster nozzles 46 in a conventional manner.

It is an important characteristic of the "Y"-piece that it has an indirect line of sight from its inlet end to its outlets ends thereby enhancing its sound absorbing characteristics. In other words, it is impossible to see through the "Y"-piece from one end to the other because of the configuration of the diverging legs 37.

The integration of the duct 17 with the instrument panel structure may best be seen with reference to FIGS. 4-8, inclusive, all of which are section views.

In FIG. 4 is shown a register 14 and the duct extension 29 coupling the register 14 to the duct 17. Shown in section are portions of the upper and lower walls 47 and 48 defining the upper and lower duct surfaces 22 and 23. The inlet port 38 to which a diverging leg of the "Y"-piece 35 is coupled is also visible.

The crash pad 16 is illustrated as being supported on a thin sheet metal backing 49. It will be noted there is a substantial insulation air gap 51 between the pad and adjacent duct surfaces.

FIG. 5 is a section view substantially through the vertical center of the instrument bearing portion 12 of the instrument panel 11. Visible in this view is the duct 17 with its walls defining its frontal surface 21, the upper surface 22 and the lower surface 23. The cover plate 27 completes the enclosure of the duct. The crash pad is shown mounted on an extension 52 of the upper wall 47 of the duct 17 at this location.

FIGS. 6, 7 and 8, respectively, are sections on the lines 6—6, 7—7 and 8—8 of FIG. 2 and further illustrate the relationship of the integral duct with the instrument panel at various positions along the longitudinal length of the two.

There are a number of advantages to be derived from integrating the duct with the instrument panel by molding the two as a single unit. From a vehicle design standpoint, a better package results from integration of the duct with the instrument panel. The cover and the "Y"-piece can be assembled on a subassembly line rather than having to connect all the parts at final assembly. Another advantage is a complexity reduction in that less pieces have to be handled by the subassemblers and assembliers.

It is believed that the design of the "Y" connecting section will result in a noise lever reduction in that the noise from the plenum chamber is arrested without undue negative effect on the flow of air. The cover can be coated with a sound absorbing material, if necessary. From a styling standpoint, the design permits unlimited register design flexibility as the shape and location of each register does not necessarily result in addition of duct pieces since the extensions from the duct to the registers can be molded integrally therewith.

It is to be understood that the invention is not limited to the exact construction illustrated and described above, but that various changes and modifications may be made without departing from the spirit and scope of the invention as defined by the following claims:

We claim:

1. An air distribution system for a vehicle body having a molded plastic instrument panel extending across the vehicle body passenger compartment, the instrument panel being capped by a crash pad assembly, the air distribution system comprising a duct integrally molded into the instrument panel and extending substantially across the width of the latter, the duct having frontal and top wall portions in common with the instrument panel and being encompassed across its frontal and upper surfaces by the crash pad with an insulating air gap therebetween, the duct being substantially uniformly open across its surface opposite its crash pad covered frontal surface, a cover plate fitted on the duct over the open surface thereof, spaced openings in the face of the instrument panel in communication with the integral duct, the spaced openings providing for air distribution to the interior of the vehicle body, and pipe means connected to the cover plate and adapted to be coupled to a plenum chamber of a vehicle heating and cooling unit.

2. An air distribution system according to claim 1, in which:

the integrally molded duct is substantially "U"-shaped for its length with the legs of the "U" being vertically spaced, substantially parallel, relationship and the closed end of the "U" facing toward the passenger compartment, the closed end of the "U" forming the frontal surface and the upper leg of the "U" forming the upper surface of the instrument panel and being spaced from the crash pad by the air gap.

3. An air distribution system according to claim 2, in which:

the integrally molded duct has a plurality of integrated extensions aligned with the spaced openings in the face of the instrument panel, the spaced openings being adapted to receive air registers.

4. An air distribution system according to claim 3, in which:

the pipe means connected to the cover plate and adapted to be coupled to a plenum chamber comprises a substantially "Y"-shaped piece, the "Y" piece having the upper end of each diverging leg connected to a respective spaced port in the cover and the vertical leg integral with a flange portion for connection to a plenum chamber.

5. An air distribution system according to claim 4, in which:

the "Y" piece has an indirect line of sight from its inlet end to its outlet ends thereby enhancing the sound absorbing characteristics.

6. An air distribution system according to claim 1, in which:

the integrally molded duct has a plurality of integrated extensions aligned with the spaced openings in the face of the instrument panel, the spaced openings being adapted to receive air registers.

7. An air distribution system according to claim 6, in which:

the pipe means connected to the cover plate and adapted to be coupled to a plenum chamber comprises a substantially "Y"-shaped piece, the "Y" piece having the upper end of each diverging leg connected to a respective spaced port in the cover and the vertical leg integral with a flange portion for connection to a plenum chamber.

8. An air distribution system according to claim 7, in which:
the "Y" piece has an indirect line of sight from its inlet end to its outlets ends thereby enhancing the sound absorbing characteristics.

9. An air distribution system according to claim 1, in which:
the pipe means connected to the cover plate and adapted to be coupled to a plenum chamber comprises a substantially "Y"-shaped piece,
the "Y" piece having the upper end of each diverging leg connected to a respective spaced port in the cover and the vertical leg integral with a flange portion for connection to a plenum chamber.

10. An air distribution system according to claim 9, in which:
the "Y" piece has an indirect line of sight from its inlet end to its outlet ends thereby enhancing the sound absorbing characteristics.

11. An air distribution system for a vehicle body having a molded plastic instrument panel extending across the width of the vehicle body passenger compartment at the front end thereof,
the instrument panel having a vehicle instrumentation portion and an offset storage compartment portion,
a crash pad assembly capping the instrument panel above a portion of a front face wall and an upper wall of the latter,
the crash pad being spaced by an insulating air gap from the adjacent instrument panel walls in most areas of possible contact,
a two piece plastic air distribution duct integrally formed in the molded instrument panel,
the duct being substantially a box section with the front face wall of the instrument panel forming one wall thereof and the instrument panel upper wall the upper wall thereof,
the duct having a bottom wall vertically spaced from the upper wall and a separate cover plate forming a wall opposite the front face wall of the instrument panel,
the front face of the instrument panel having register containing openings in communication with the air distribution duct,
and intermediate pipe means connected to the cover plate and adapted to be coupled to a plenum chamber of a vehicle heating and cooling unit.

12. An air distribution system according to claim 11, in which:
the intermediate pipe means comprises a substantially "Y"-shaped piece,
the "Y" piece having the upper end of each diverging leg connected, respectively, to a spaced port in the cover and the vertical leg integral with a flange portion for connection to a plenum chamber,
the "Y" piece having an indirect line of sight from its inlet end to its diverging outlet ends thereby enhancing its sound absorbing characteristics.

* * * * *